United States Patent
Flickinger et al.

(10) Patent No.: US 6,483,806 B1
(45) Date of Patent: Nov. 19, 2002

(54) SIGNAL DETECT CIRCUITRY FOR A PASSIVE GBIC MODULE

(75) Inventors: Steven L. Flickinger, Hummelstown, PA (US); William L. Herb, Harrisburg, PA (US); Scott E. Schaeffer, Harrisburg, PA (US); Richard D. Miller, Lancaster, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/299,974

(22) Filed: Apr. 27, 1999

Related U.S. Application Data

(63) Continuation-in-part of application No. 09/200,088, filed on Nov. 25, 1998.

(51) Int. Cl.$^7$ ............................................. H04J 3/24
(52) U.S. Cl. ............................................ 370/235; 370/242
(58) Field of Search .................................. 370/235–245, 370/254, 203–210, 466–469, 487, 351, 360; 375/219; 709/250, 230

(56) References Cited

U.S. PATENT DOCUMENTS 6,295,272 B1 * 9/2001 Feldman et al. ............. 370/210
6,426,947 B1 * 7/2002 Banker et al. ............... 370/254

* cited by examiner

Primary Examiner—Kwang Bin Yao
Assistant Examiner—Prenell Jones

(57) ABSTRACT

Transceiver circuitry (10, 200) for use in a GBIC module uses readily available off the shelf components to satisfy the specifications of the GBIC standard. In both passive and active modules, a voltage divider (98) and parallel transistors (94, 96, 100) are utilized to insure that the differential voltage of the received differential signal is at an acceptable level. In active modules, a diode cross over quad (84) is utilized to extend the input range of a low input differential receiver (78) and a coaxial cable driver (60) designed to drive 50 ohms is utilized to drive 150 ohms.

5 Claims, 5 Drawing Sheets

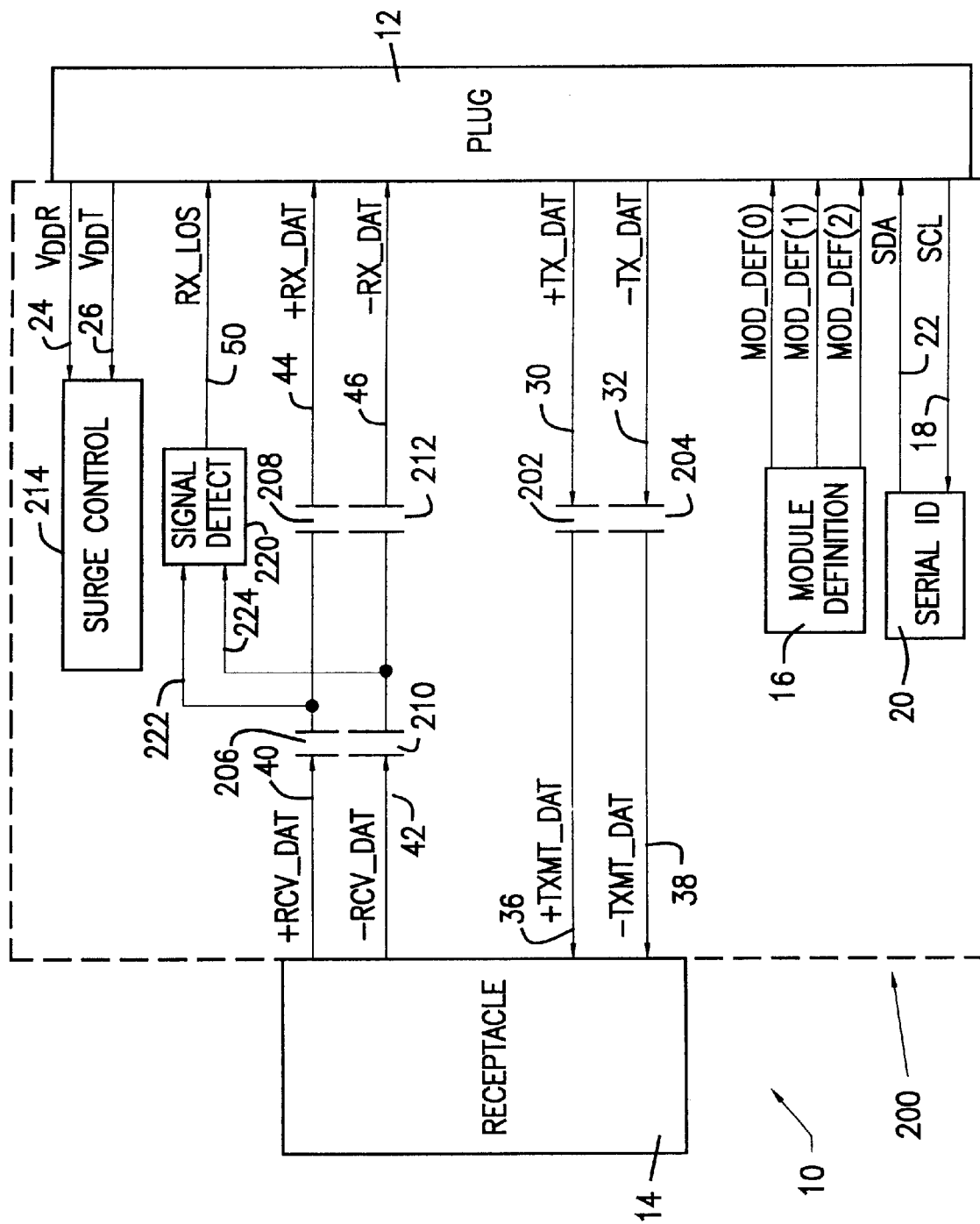

SIGNAL DETECT CIRCUITRY FOR A PASSIVE GBIC MODULE

This application is a continuation-in-part of copending application Ser. No. 09/200,088, filed Nov. 25, 1998.

BACKGROUND OF THE INVENTION

This invention relates to signal detect circuitry for use in a passive Gigabit Interface Converter (GBIC) module.

Fibre Channel and Gigabit Ethernet are high speed data transfer interfaces that can be used to interconnect workstations, mainframes, supercomputers and storage devices. Supporting numerous channel and network Upper Level Protocols (ULPs), Fibre Channel allows faster data transfer over longer distances between a larger number of devices or communication points. The standard combines attributes of a channel with attributes of a network, thus providing a general transport vehicle for ULPs such as the Small Computer System Interface (SCSI), the Intelligent Peripheral Interface (IPI), the High Performance Parallel Interface (HIPPI), the Internet Protocol (IP), Ethernet (IEEE 802.3) and the Asynchronous Transfer Mode (ATM). Accommodating the pattern of ever increasing data rates, Fibre Channel is a scalable interconnect standard that considers all aspects of speed, length and media (copper and fiber). Fibre Channel development is focused on data transfer at 1.0625 Gbits/sec with provisions for 2.125 Gbits/sec and 4 Gbits/sec.

AMP Incorporated of Harrisburg, Pa., Compaq computer Corporation of Houston, Tex., Vixel Corporation of Bothell, Wash. and Sun Microsystems Computer Company of Mountain View, Calif. have together agreed on and written a standard for a serial transceiver module, which is called the Gigabit Interface Converter (GBIC) module. The module provides a single small form factor for a wide variety of standard Fibre Channel connectors and transmission media. The module can be inserted in or removed from a host or switch chassis without first removing power from the receiving socket. Any copper and optical transmission technologies consistent with the form factor can be used.

The GBIC module has a plug in a first insulative housing and a receptacle in a second insulative housing at respective opposite ends of the module. A printed circuit board containing transceiver circuitry is secured to, and connects, the plug and the receptacle. The module is insertable into a guide structure mounted to a host board and having a receiving end and a terminating end. The terminating end of the guide structure has a receptacle for mating engagement with the module plug when the module is fully inserted in the guide structure. The guide structure houses and aligns the module and provides polarized guide rails to prevent incorrect installation of the module and is designed to accept the side retention latches specified in the GBIC module standard.

The standard for the GBIC module sets signal specifications for all positions of the module plug and receptacle. In particular, the GBIC module is driven from the host board with serial differential positive emitter coupled logic (PECL) signals applied to a pair of transmission data leads. There are two basic types of GBIC modules when the transmission medium is wire, rather than fiber. The passive GBIC module is for use when the length of the wire is up to about thirteen (13) meters. Thus, the passive GBIC module merely passes signals between the host and the transmission medium, without providing any signal processing or amplification. However, when the length of the wire is greater than about thirteen (13) meters, up to about thirty (30) meters, an active GBIC module is required to provide an appropriate power boost to the signals.

The serial receiver on the active GBIC module board detects incoming signals and amplifies and converts them to provide to the host board serial differential PECL data signals on a pair of receive data leads. Various control and status signals are also specified in the active GBIC module standard. For example, a receive loss of signal (RX_LOS) indication is generated when the incoming data signal amplitude is not sufficient to achieve the specified bit error rate or to indicate loss of power at the receiver circuit. A transmission fault signal is generated to indicate a failure has been detected in the transmission conversion circuit or to indicate loss of power at the transmit circuit. The output from the transmission conversion circuit is also disabled in response to a transmit disable signal generated by the host.

A typical application for a passive GBIC module is in a fiber channel arbitrated loop. In such a loop, there is a hub with multiple ports, each with a passive GBIC module. The hub interrogates the ports to see what is connected to each port. If the passive GBIC module is connected either to an open line or to a turned off terminal, crosstalk between the receive and transmit wires sends the interrogation signal back to the hub receiver at a very low level. The sensitivity of a hub receiver is typically 25 millivolts, whereas the GBIC specification calls for a minimum signal level of 400 millivolts. The crosstalk signal sent back to the hub could exceed the 25 millivolt sensitivity of the receiver, so that the receiver senses this signal and waits for a handshake which never arrives. Accordingly, the entire system freezes up. Until now, the passive GBIC module did not contain any active circuitry, its only function being to pass signals between the host and the transmission media. It would therefore be desirable to equip a passive GBIC module with circuitry for detecting when a received signal was below the minimum threshold called for in the GBIC specification so as to prevent the host from falsely responding to a low level signal.

SUMMARY OF THE INVENTION

A passive GBIC module is adapted for connection between a host and a transmission medium, with the module having a pair of receive circuit paths extending between a receptacle connectable to the transmission medium and a plug connectable to the host. Each of the pair of receive circuit paths includes a respective first series capacitor. According to the present invention, a signal detection circuit is connected to the pair of receive circuit paths and a respective second series capacitor is inserted in each of the receive circuit paths on the other side of the respective connection to the signal detection circuit from the respective first series capacitor.

In accordance with an aspect of this invention, the signal detection circuit comprises a current supply and an operational amplifier having an inverting input, a non-inverting input and an output. A first controllable switching element is coupled to the current supply and to the non-inverting input of the operational amplifier. A second controllable switching element is coupled to the current supply and to the inverting input of the operational amplifier. A third controllable switching element is coupled to the current supply and to the inverting input of the operational amplifier. The second controllable switching element has a control terminal coupled to a first of the pair of receive circuit paths and the third controllable switching element has a control terminal coupled to the other of the pair of receive circuit paths. The control terminals of the second and third controllable switching elements are further coupled to a fixed bias voltage and the control terminal of the first controllable switching element is coupled to a bias voltage equal to the fixed bias voltage plus one half the predetermined differential threshold. Accordingly, the output of the operational amplifier is at a first level when the differential between signals appearing on the pair of receive circuit paths exceeds the predetermined differential threshold and is at a second level when the differential between signals appearing on the pair of receive circuit paths is less than the predetermined differential threshold.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 4 shows the format and voltage levels of the receive signals applied to the loss of signal detect circuitry and is useful for understanding the disclosed circuitry;

FIG. 5 is a block diagram of circuitry for a passive GBIC module showing the incorporation of signal detect circuitry according to this invention.

DETAILED DESCRIPTION

Figure 1:
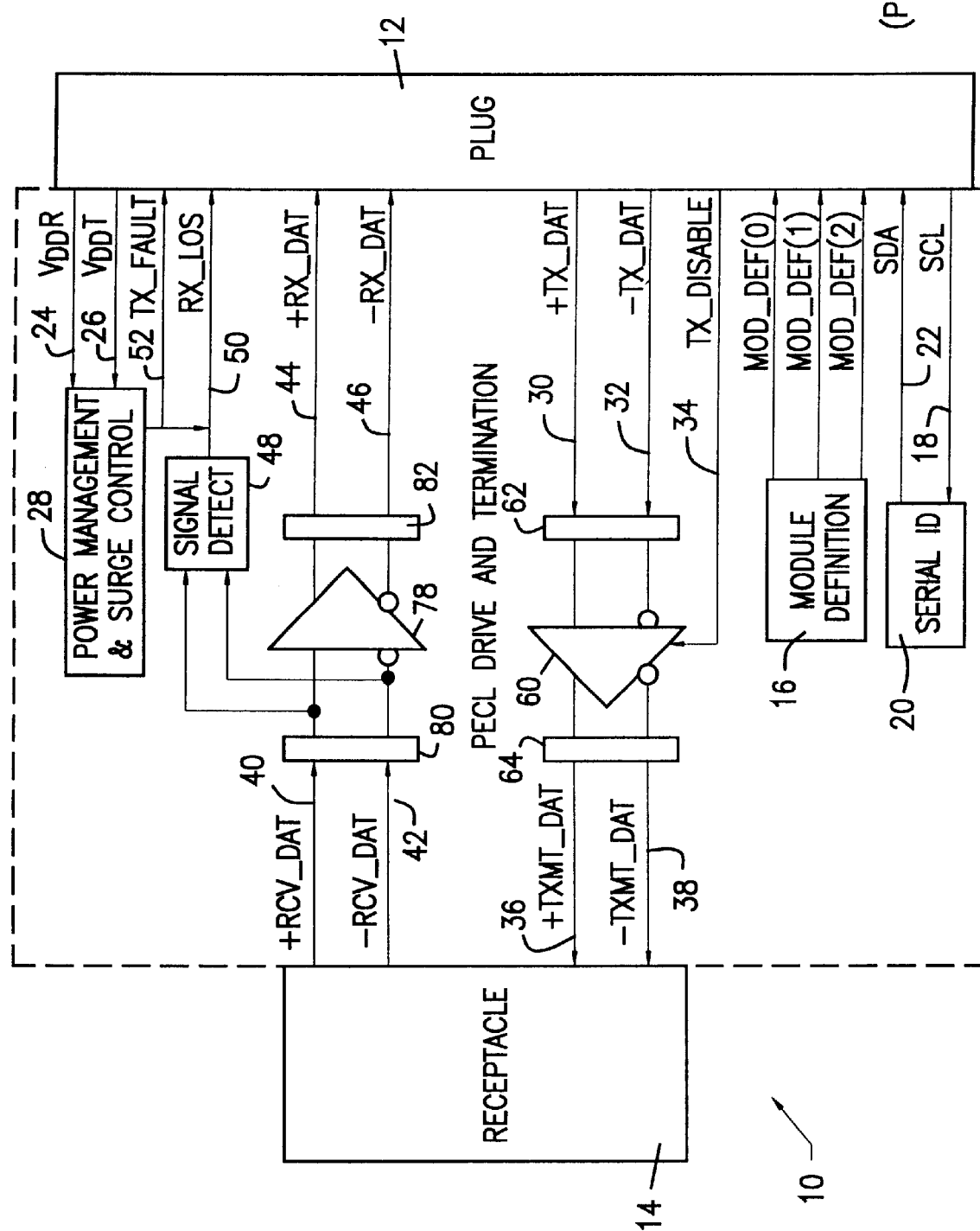
FIG. 1 is a block diagram of transceiver circuitry for an active GBIC module according to the GBIC module standard.

FIG. 1 is a block diagram of the active GBIC module transceiver circuitry, designated generally by the reference numeral 10, according to the GBIC module standard. As shown, the transceiver circuitry 10 is connected at one end to a plug 12 adapted for connection to the host, and at the other end to a receptacle 14 adapted for connection to a transmission medium (copper wire in the case of the inventive circuitry). The positions of the various signal leads within the plug 12 and the receptacle 14 are set forth in the GBIC module standard.

As shown, the particular type of module is defined by three binary signals at the output of the module definition circuit 16, so that eight possible types of modules can be defined. Each module can have its own unique identification number which is available to the host by applying a serial clock on the clock lead 18 to the serial ID circuit 20, which in turn provides serial identification data to the host over the lead 22.

Power for the transceiver circuitry is provided by the host over the leads 24, 26 to the power management and surge control circuit 28. The host also provides transmission data differential signals over the leads 30, 32 and a transmission disable signal over the lead 34 when transmission by the GBIC module is to be disabled. The transceiver circuitry 10, in the absence of the transmission disable signal on the lead 34, amplifies the transmission data signals received over the leads 30, 32 and provides them to the transmission media as amplified differential signals on the leads 36, 38.

The transceiver circuitry 10 receives from the transmission medium receive differential data signals on the leads 40, 42. These signals are amplified and provided to the host over the leads 44, 46. At the same time, the received differential signals are provided to the signal detect circuit 48. The signal detect circuit 48 analyzes the received signals to determine whether the received signal amplitude and switching rate are acceptable to achieve the specified bit error rate. If these characteristics are unacceptable, a loss of signal indication is provided over the lead 50. In addition, the power management and surge control circuit 28 provides a transmission fault signal to the host over the lead 52 when the power received from the host is not stable.

The GBIC module standard sets forth detailed specifications for the timing and voltage levels of all of the signals passing between the transmission medium and the transceiver circuitry 10 and between the host and the transceiver circuitry 10. However, the GBIC module standard provides the designer with freedom to design transceiver circuitry 10 which meets those specifications.

Figure 2:
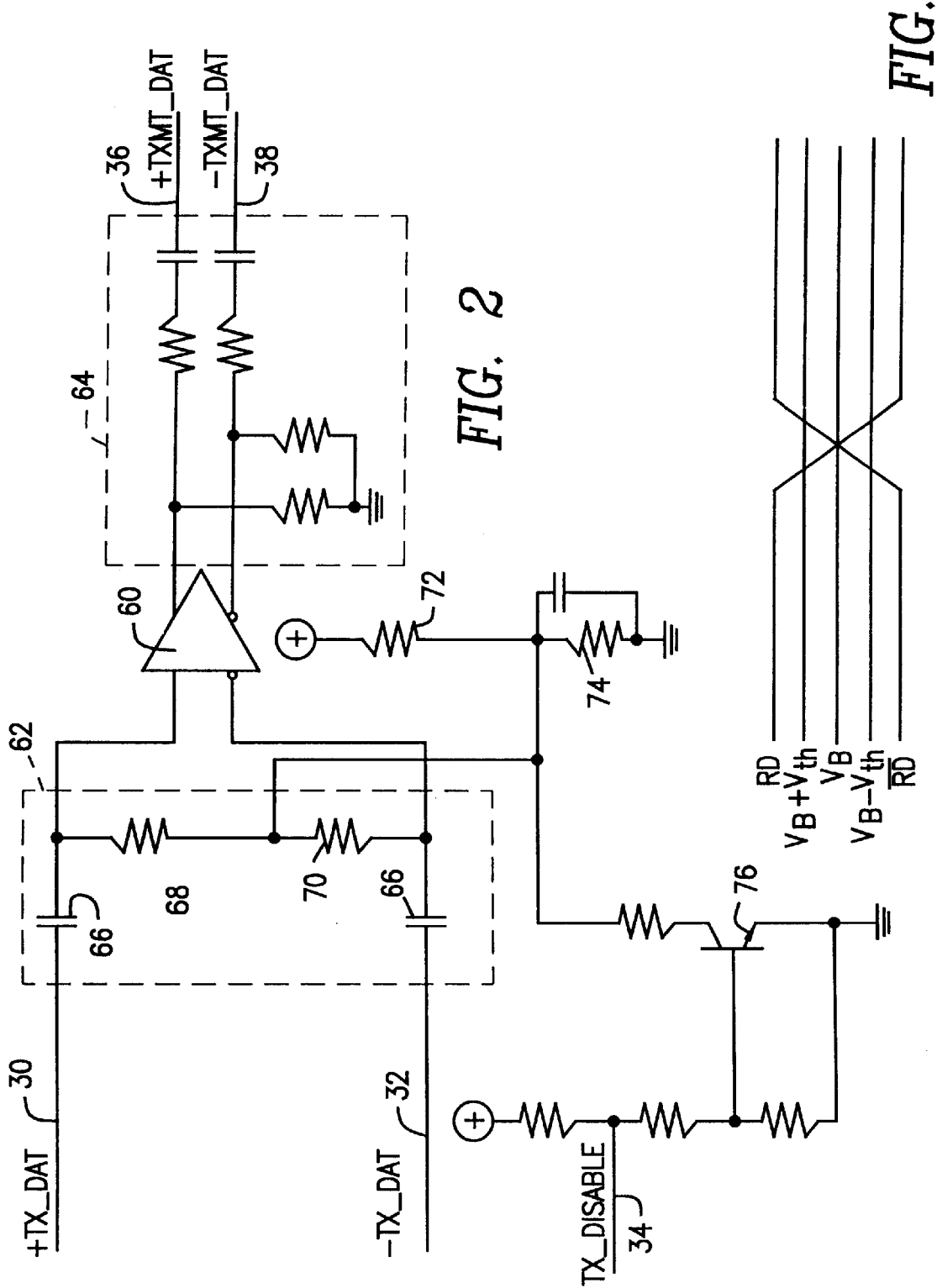
FIG. 2 is a schematic circuit diagram of transmit circuitry including transmit disable circuitry incorporated in the system of FIG. 1.

Referring now to FIG. 2, the transmit circuitry includes a differential line driver 60 coupled through the input termination circuitry 62 to receive the transmission data signals from the host on the leads 30, 32 and is coupled through the output termination circuitry 64 to provide amplified differential signals to the transmission media on the leads 36, 38. The output termination circuitry 64 filters the differential transmission signals and balances them around ground. The input termination circuitry 62 includes capacitors 66 to eliminate DC levels and has the junction of series connected equal resistors 68, 70 coupled to a bias voltage provided by the divider network including the resistors 72, 74 to shift the transmit data differential signals on the leads 30, 32 to a range that the driver 60 operates in. The differential line driver 60, which illustratively is a coaxial cable driver, boosts the 650 mv signal provided by the host over the leads 30, 32 to a 1200 mv signal on the leads 36, 38 which is capable of driving thirty meters of copper cable. The inventive transmit circuitry responds to a transmission disable signal on the lead 34 to bring the junction of the resistors 68, 70 to ground level so that the signals applied to the driver 60 are outside the useable range. Under normal operating conditions, the transmit disable signal on the lead 34 is low, maintaining the transistor 76 non-conductive. However, when the transmit disable signal on the lead 34 is brought high by the host, the transistor 76 conducts, grounding the junction of the resistors 68, 70 and disabling operation of the driver 60.

Figure 3:
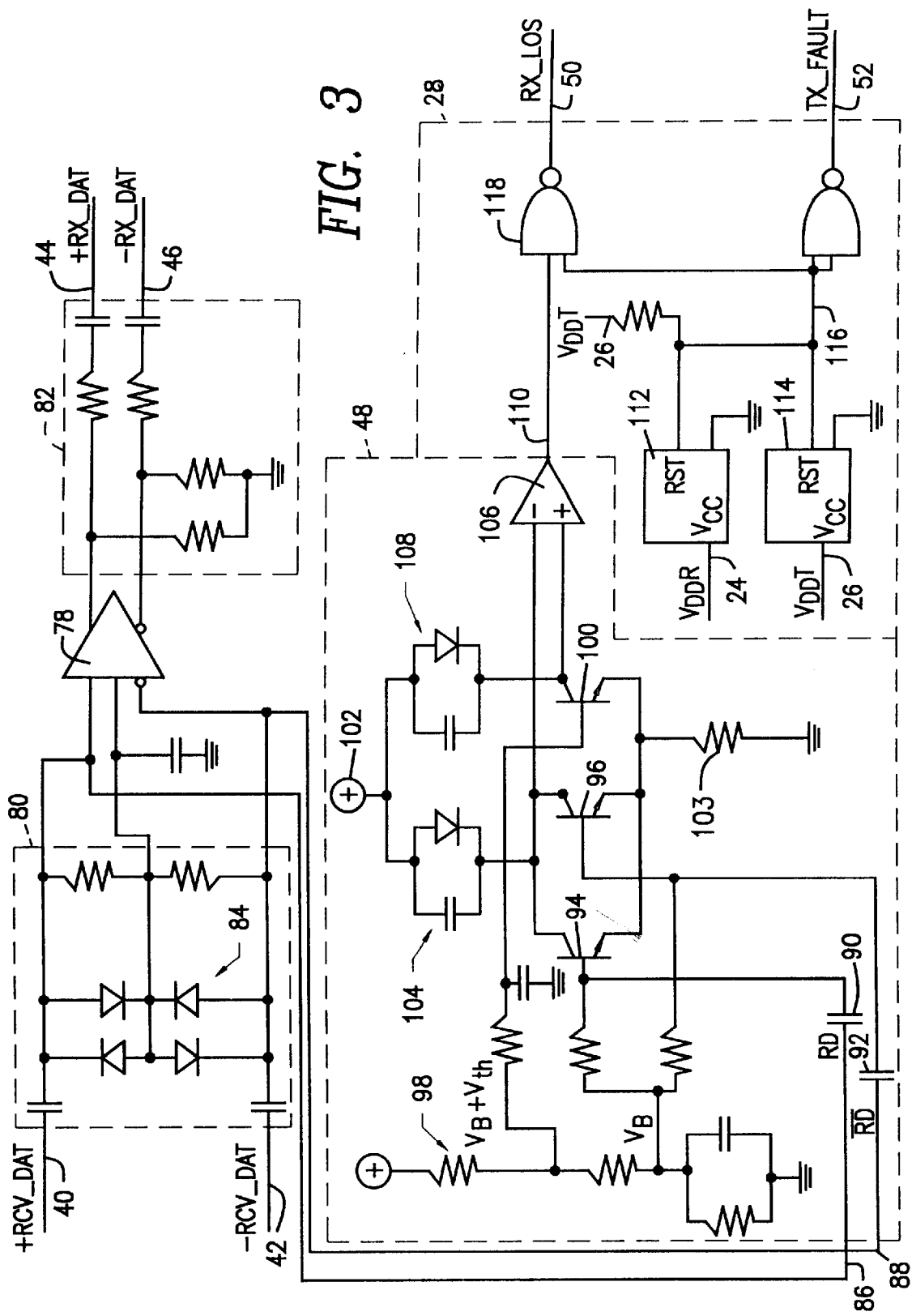
FIG. 3 is a schematic circuit diagram of receive circuitry showing the loss of signal detect circuitry and the power management and surge control circuitry incorporated in the system of FIG. 1.

As shown in FIG. 3, the differential data signals received from the transmission medium on the leads 40, 42 are applied to the differential receiver 78, through the input termination. circuitry 80. The output from the differential receiver 78 is provided, through the output termination circuitry 82, to the host over the leads 44, 46. The input termination circuitry 80 includes a diode array 84 connected to clip the incoming received signal so that it remains below levels which the receiver 78 can tolerate.

The output from the termination circuitry 80 is also provided as an input to the signal detect circuitry 48 over the leads 86, 88, labeled RD and $\overline{RD}$, respectively. FIG. 4 shows the format and voltage levels of the signals RD and $\overline{RD}$. As is conventional, the differential signals RD and $\overline{RD}$ are equally spaced about a baseline voltage $V_B$. In order to be acceptable, these differential signals have to be separated from the baseline voltage $V_B$ by a minimum threshold voltage $V_{th}$. Illustratively, to insure that the incoming signal amplitude is acceptable, $V_{th}$ is set at 75 mv.

The signals RD and $\overline{RD}$ are applied to the signal detect circuitry 48, where they must pass through the capacitors 90, 92, which maintain the baseline voltage $V_B$ and block unwanted DC signals. The signals are then provided to the bases of the transistors 94, 96, where they are added to the voltage $V_B$ provided by the voltage divider 98. The voltage divider 98 provides the voltage $V_B+V_{th}$ to the base of the transistor 100. The collectors of the transistors 94, 96 are tied together and are connected to the voltage source 102 through the filter network 104. In addition, the collectors of the transistors 94, 96 are connected to the inverting input of the comparator 106. The collector of the transistor 100 is connected to the voltage source 102 through the filter network 108 and is also directly connected to the non-inverting input of the comparator 106. The voltage source 102 in series with the resistor 103 to ground functions as a current source. Accordingly, if the voltage levels of the signals RD and $\overline{RD}$ are not spaced from the base line voltage $V_B$ by at least the threshold voltage $V_{th}$, only the transistor 100 will conduct. When the signals RD and $\overline{RD}$ are at an acceptable level, the transistors 94 and 96 will alternately conduct and the transistor 100 will not conduct. The filter networks 104, 108 eliminate transient switching due to the switching time of the differential signals RD and $\overline{RD}$. Thus, the output of the comparator 106 on the lead 110 is high when the incoming signal level is acceptable and is low when the incoming signal level is unacceptable.

The power management and surge control circuit 28 receives power from the host on the leads 24, 26, which are applied to the reset circuits 112, 114, respectively, which are illustratively MAX 6315 open-drain SOT microprocessor reset circuits manufactured by Maxim Corporation. These reset circuits 112, 114 provide a low signal on the lead 116 until the power provided by the host is stable. Conversely, the transmission fault signal to the host on the lead 52 is high until the power stabilizes.

The signals on the leads 110 and 116 are also applied as inputs to the NAND gate 118, whose output on the lead 50 is the loss of signal lead to the host. Thus, the signal on the lead 50 is high either if the signal received over the transmission medium is unacceptable or if the power provided by the host is not stable.

FIG. 5 is a block diagram of the passive GBIC module transceiver circuitry, designated generally by the reference numeral 200, according to the present invention. As far as physical layout is concerned, the passive GBIC module is the same as the active GBIC module (i.e., they are interchangeable plug-in units). Elements in the passive GBIC module shown in FIG. 5 which are the same as elements of the active GBIC module shown in FIG. 1 are identified by the same reference numeral. Thus, the passive GBIC module has a plug 12 at one end adapted for connection to the host and a receptacle 14 at the other end adapted for connection to a transmission medium. The positions and designations of the various signal leads within the plug 12 and the receptacle 14 are set forth in the GBIC module standard.

As shown, the transceiver circuitry 200 functions to pass transmission data differential signals received from the host over the transmit circuit paths on the leads 30, 32 to the transmission medium over the leads 36, 38, through the DC-blocking capacitors 202, 204. Similarly, the transceiver circuitry 200 functions to pass received transmission medium differential data signals over the receive circuit paths on the leads 40, 42 to the host over the leads 44, 46, through the DC-blocking capacitors 206, 210. The surge control circuit 214 provides in-rush current limiting when power is first applied to the passive GBIC module.

Figure 6:
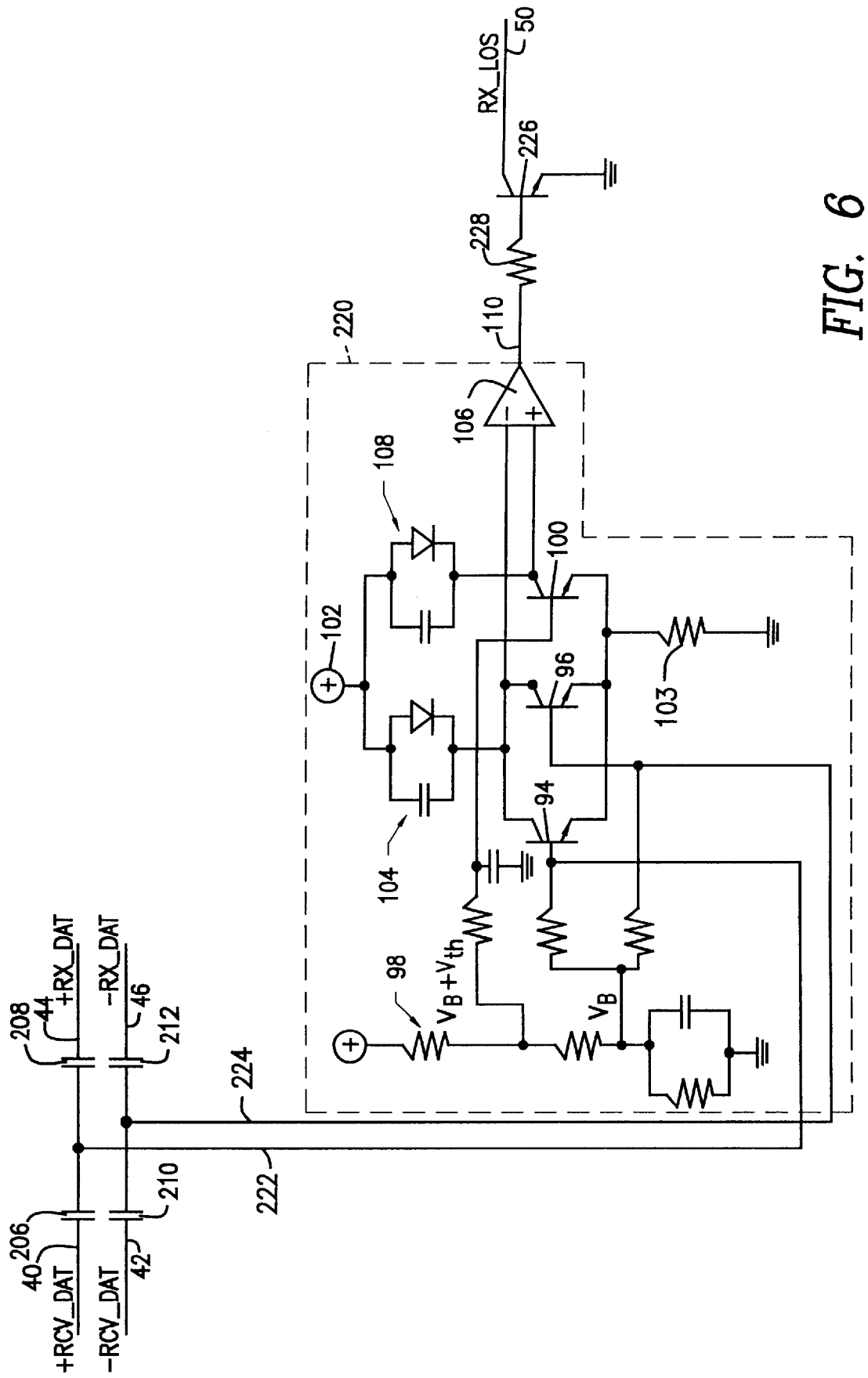
FIG. 6 is a schematic circuit diagram of the signal detect circuitry of the system of FIG. 5.

In accordance with the present invention, the signal detect circuit 220 is coupled to the pair of receive circuit paths by the leads 222, 224. The additional blocking capacitors 208, 212 are inserted in the receive circuit paths on the other sides of the connections to the signal detect circuit 220 from the capacitors 206, 210. The signal detect circuit 220 is shown in FIG. 6 and it is seen that the circuit 220 is the same as the circuit 48 (FIG. 3) with the exception of the capacitors 90, 92, which have been eliminated. Thus, as previously described, the output of the comparator 106 on the lead 110 is high when the incoming signal level is acceptable and is low when the incoming signal level is unacceptable. The lead 110 is connected to the base of the transistor 226 through the resistor 228.

Accordingly, if the incoming signal level is acceptable, the loss of signal lead 50 to the host is pulled low and if the received signal is unacceptable, the loss of signal lead 50 floats high. The host is able to distinguish the level of the signal on the loss of signal lead 50 and ignores signals below the required threshold. As an alternative to this signalling of the host, an amplifier can be placed in the receive lines 44, 46 and the output of the signal detect circuit 220 can be utilized to disable the amplifier if the receive signal is unacceptable. It has been found that when such an amplifier is disabled, the signal level to the host is below the sensitivity of the host receiver.

Accordingly, there has been disclosed improved circuitry for use in a passive GBIC module. Several aspects of the present invention provide an advantageous result. For example, the signal detect circuit insures that the peak-to-peak differential voltage is greater than twice $V_{th}$ and the switching rate is at an acceptable level. Importantly, the circuitry is constructed of readily available components to allow the inclusion of the signal detect function in a passive GBIC module at minimum cost.

Thus, while an illustrative embodiment of the present invention has been disclosed herein, it is understood that various modifications and adaptations to the disclosed circuitry will be apparent to one of ordinary skill in the art and it is intended that this invention be limited only by the scope of the appended claims.

What is claimed is:

1. A passive GBIC module adapted for connection between a host and a transmission medium, the module including a pair of receive circuit paths extending between a receptacle connectable to the transmission medium and a plug connectable to the host, each of the pair of receive circuit paths including a respective first series capacitor, wherein the improvement comprises:

a signal detection circuit connected to the pair of receive circuit paths; and a respective second series capacitor in each of the receive circuit paths on the other side of the respective connection to the signal detection circuit from the respective first series capacitor.

2. The improvement according to claim 1 wherein the signal detection circuit comprises:

a comparator having an inverting input, a non-inverting input and an output;

a source of current;

a first controllable switching element coupled to said current source and to the non-inverting input of said comparator;

a second controllable switching element coupled to said current source and to the inverting input of said comparator, said second controllable switching element having a control terminal coupled to a first of the pair of receive circuit paths; and a third controllable switching element coupled to said current source and to the inverting input of said comparator, said third controllable switching element having a control terminal coupled to the other of the pair of receive circuit paths;

wherein the control terminals of the second and third controllable switching elements are further coupled to a fixed bias voltage and the control terminal of the first controllable switching element is coupled to a bias voltage equal to said fixed bias voltage plus one half said predetermined differential threshold;

whereby the output of said comparator is at a first level when the differential between signals appearing on said pair of receive circuit paths exceeds said predetermined differential threshold and is at a second level when the differential between signals appearing on said pair of receive circuit paths is less than said predetermined differential threshold.

3. The improvement according to claim 2 wherein:

said current source includes a voltage source and a resistor connected to ground;

said first controllable switching element includes a first NPN transistor having its collector coupled to said voltage source through a first diode, its collector further coupled to said comparator non-inverting input, its emitter coupled to said resistor, and its base coupled to said bias voltage;

said second controllable switching element includes a second NPN transistor having its collector coupled to said voltage source through a second diode, its collector further coupled to said comparator inverting input, its emitter coupled to said resistor, and its base coupled to said fixed bias voltage and to a first of said pair of receive circuit paths; and said third controllable switching element includes a third NPN transistor having its collector coupled to said voltage source through said second diode, its collector further coupled to said comparator inverting input, its emitter coupled to said resistor, and its base coupled to said fixed bias voltage and to the other of said pair of receive circuit paths.

4. Circuitry adapted for use in a passive gigabit interface converter module to pass receive and transmit signals in a differential format, the circuitry being installed between and coupled to a plug connected to a host and a receptacle connected to a transmission medium, wherein the host provides to the circuitry power and differential signals for transmission, wherein the circuitry passes to the transmission medium the differential transmission signals, wherein the transmission medium provides to the circuitry received differential signals, wherein the circuitry generates a loss of signal indication when the differential of the received differential signals falls below a predetermined differential threshold and when the received differential signals switch at greater than a predetermined rate, and wherein the circuitry passes to the host the differential signals provided to the circuitry by the transmission medium, the circuitry comprising:

a comparator having an inverting input, a non-inverting input and an output;

a source of current;

a first controllable switching element coupled to said current source and to the non-inverting input of said comparator;

a second controllable switching element coupled to said current source and to the inverting input of said comparator, said second controllable switching element having a control terminal coupled to receive a first of the differential signals provided by the transmission medium; and a third controllable switching element coupled to said current source and to the inverting input of said comparator, said third controllable switching element having a control terminal coupled to receive a second of the differential signals provided by the transmission medium;

wherein the control terminals of the second and third controllable switching elements are further coupled to a fixed bias voltage and the control terminal of the first controllable switching element is coupled to a bias voltage equal to said fixed bias voltage plus one half said predetermined differential threshold;

whereby the output of said comparator is at a first level when the differential of the received differential signals exceeds said predetermined differential threshold and is at a second level when the differential of the received differential signals is less than said predetermined differential threshold.

5. The circuitry according to claim 4 wherein:

said current source includes a voltage source and a resistor connected to ground;

said first controllable switching element includes a first NPN transistor having its collector coupled to said voltage source through a first diode, its collector further coupled to said comparator non-inverting input, its emitter coupled to said resistor, and its base coupled to said bias voltage;

said second controllable switching element includes a second NPN transistor having its collector coupled to said voltage source through a second diode, its collector further coupled to said comparator inverting input, its emitter coupled to said resistor, and its base coupled to said fixed bias voltage and to said transmission medium to receive said first of the differential signals provided to the circuitry by the transmission medium; and said third controllable switching element includes a third NPN transistor having its collector coupled to said voltage source through said second diode, its collector further coupled to said comparator inverting input, its emitter coupled to said resistor, and its base coupled to said fixed bias voltage and to said transmission medium to receive said second of the differential signals provided to the circuitry by the transmission medium.

* * * * *